(12) United States Patent
Allen (10) Patent No.: US 11,621,667 B2
(45) Date of Patent: Apr. 4, 2023

(54) AGGREGATE OFF THE GRID POWER SYSTEM

(71) Applicant: Michael Allen, Kiowa, CO (US)

(72) Inventor: Michael Allen, Kiowa, CO (US)

( * ) Notice: Subject to any disclaimer, the term of this patent is extended or adjusted under 35 U.S.C. 154(b) by 531 days.

(21) Appl. No.: 16/571,750

(22) Filed: Sep. 16, 2019

(65) Prior Publication Data

US 2021/0083621 A1 Mar. 18, 2021

(51) Int. Cl.
  *H02J 3/00* (2006.01)
  *H02S 10/10* (2014.01)
  *H02S 40/32* (2014.01)
  *H02S 40/38* (2014.01)

(52) U.S. Cl.
  CPC .............. *H02S 40/38* (2014.12); *H02S 10/10* (2014.12); *H02S 40/32* (2014.12); *H02J 2300/22* (2020.01)

(58) Field of Classification Search
  CPC .......... H02S 40/38; H02S 10/10; H02S 40/32; Y02B 10/10; Y02E 10/56; Y02E 70/30; H02J 13/00036; H02J 13/00004; H02J 2300/24; H02J 2310/12; H02J 3/381; H02J 7/35; H02J 3/02; H02J 1/08; H02J 7/34; H02J 3/14; H02J 3/32; H02J 3/383
  See application file for complete search history.

(56) References Cited

U.S. PATENT DOCUMENTS

| | | | |
|---|---|---|---|
| 9,651,973 B2 | 5/2017 | Forbes, Jr. | |
| 9,735,703 B2 | 8/2017 | Dent | |
| 9,948,138 B2 | 4/2018 | Motsenbocker | |
| 2009/0027932 A1 | 1/2009 | Haines | |
| 2009/0205266 A1 | 8/2009 | Fennell | |
| 2010/0127572 A1 | 5/2010 | Uselton | |
| 2014/0015324 A1* | 1/2014 | Brennan | H02J 3/381 307/72 |
| 2015/0303696 A1 | 10/2015 | Nethery | |
| 2015/0303829 A1 | 10/2015 | Ilic | |
| 2015/0378381 A1 | 12/2015 | Tinnakornsrisuphap | |
| 2016/0204610 A1 | 7/2016 | Matan | |
| 2016/0352131 A1 | 12/2016 | Nelson | |
| 2017/0271875 A1* | 9/2017 | Narla | H02J 3/381 307/72 |
| 2018/0034299 A1* | 2/2018 | Seman, Jr. | H02J 9/061 |
| 2018/0076629 A1* | 3/2018 | McMorrow | H02J 3/385 |

FOREIGN PATENT DOCUMENTS

| | | |
|---|---|---|
| CN | 101765959 A | 6/2010 |
| EP | 2145374 | 3/2014 |
| JP | 2016077146 | 5/2016 |
| WO | WO2015013658 | 1/2015 |

* cited by examiner

*Primary Examiner* — Lincoln D Donovan
*Assistant Examiner* — Alex W Lam
(74) *Attorney, Agent, or Firm* — Leyendecker & Lemire (57) ABSTRACT

Embodiments of the present invention comprise two or more distinct solar power systems associated with a single residence or building that together form an aggregate solar power system. Advantageously, high draw appliances can be distributed among the different systems such that the high current draw of one appliance on a first system will not negatively impact the high current draw of another high draw appliance on a second system.

14 Claims, 5 Drawing Sheets

AGGREGATE OFF THE GRID POWER SYSTEM

BACKGROUND

Residential solar power systems are becoming more and more popular as people desire to reduce their and the country's dependence on electricity generated from oil, coal and other green house gas creating power plants. In most instances, the residential solar power system is tied into the power grid with excess power generated by the array being fed into the grid and additional power being available from the grid when the panels are not producing enough to supply the need at any point in time. However, people who live remotely from a population center may not have the opportunity or ability to tie into the grid. In these instances, an owner of a rural residence can elect to install a standalone electric solar power system.

Standalone electric power systems typically comprise solar panels, batteries, a charge controller, and an inverter, which feeds electricity into the main breaker box. The number and size of the panels are chosen for a particular system to produce sufficient power each day to handle the average needs of the associated household. The storage capacity of the batteries is chosen based on a maximum instantaneous draw of power that may be required at time by the household, as well as, having enough accessible capacity to provide electrical power during occasional periods of prolonged reduced output of the panels, such as may occur from a longer than typical periods of overcast conditions. The inverter is employed to convert the DC electricity generated by the panels and stored by the batteries into AC electricity at a standard household voltage, such as 120 volts. The charge controller acts to control the charging of the batteries as well as the draw of power from the batteries. The converted AC power is directed to the main breaker box that typically includes a system breaker and a breaker for all of the circuits within the house/building.

Depending on various building codes, one or more shut off switches can be required for the system. For instance, the prevailing electrical code may require a single DC power shut off switch that can disconnect flow from the solar panels and the batteries to the inverter. The code may also require a single switch to disconnect the flow of AC power from the inverter to the circuit panel.

There can be numerous challenges living with an off-the-grid solar power system. Most significantly, care must be taken not to overload the system during use as the instantaneous current draw from the batteries through the inverter is limited. Running two or more high draw appliances through an inverter simultaneously can cause an overload especially when an appliance draws significantly more current on its start up. This can also damage a battery bank and reduce its lifespan. Consequently, users of such systems must take care not to run too many high load appliances simultaneously. High load appliances can include, but are not limited to, washers, electric dryers, dishwashers, refrigerators when compressor is active, electric ovens and cooktops, air conditioners, hair dryers, vacuum cleaners, certain power tools, and electric heaters. Even if the inverter is sized for high loads the rate of current draw out of the batteries is typically limited.

As an additional concern, use of high load appliances especially in evening hours when power is provided exclusively by the batteries, the batteries may be drawn down significantly. Drawing even deep cycle batteries below a 50% charge can act to significantly reduce their lifespan.

While systems can be designed to handle high loads, the costs of such systems can become impractical. Much higher gauge cable is required, bigger or more inverters are necessary, more batteries must be employed requiring larger solar arrays to provide the necessary electricity to recharge the batteries. Unfortunately, larger battery arrays can result in longer times required to fully charge the batteries with the series of batteries nearest the electrical input of the solar panels charging more quickly than those farthest away.

Ultimately, considering the foregoing the additional cost of installing a higher powered system that would permit those living in a residence with an off-the-grid solar power system to utilize electricity in a similar manner as a home located on the grid without concern of overloading the system outweighs the benefits provided by the more robust system. Consequently, most owners of off-the-grid residences make do with smaller solar power systems and adjust their lifestyles to the limitations of the system.

DETAILED DESCRIPTION OF THE INVENTION

Embodiments of the present invention comprise two or more distinct solar power systems associated with a single residence or building that together form an aggregate solar power system. Advantageously, high draw appliances can be distributed among the different systems such that the high current draw of one appliance on a first system will not negatively impact the high current draw of another high draw appliance on a second system. For example, the user of embodiments of the present invention could conceivably run a washing machine at the same time that a dryer is being run, or a dishwasher can be run the same time a resident is cooking on an electric cook top. Because of the finite current draw of a traditional off-the-grid residential solar power system, this would not be possible with most prior art systems.

Electrical codes in the various states, counties and municipalities around the country typically require that off-the-grid solar power system have one or more system shut off switches to discount the flow of electricity. At least some codes require both a DC shutoff and an AC shutoff. Embodiments of the present system utilize a DC shutoff switch and an AC shutoff switch that when each is thrown simultaneously disrupt the flow of electricity to all the systems associated with a particular residence or building thereby satisfying necessary codes. More specifically, a shut off switch for either DC or AC power will flip breakers for each system when a single lever is thrown.

Other embodiments of the present invention further incorporate relay switches and electronic controllers that permit distinct solar power systems comprising a solar panel assembly, a battery bank, a charge controller, and an inverter to be switched between different subpanels of breakers wherein each subpanel is electrically coupled to a particular set of appliances and household electrical circuits. Accordingly, a user or an intelligent controller can assess the current draw on a subpanel and associate a particular solar power system based on, for instance, the charge state of the associated battery bank. For example, if the battery bank supplying the air conditioning is getting low, the user can switch the associated subpanel to a system with a fully charged battery bank while associating the system with the partially depleted battery with a subpanel that is not experiencing significant current draw.

As can be appreciated, in some embodiments the intelligent controller can be programmed to automatically switch between systems as necessary to limit the draw down on any bank of batteries balancing the load between the two or more systems. In yet other embodiments, the intelligent controller may employ artificial intelligence to learn the residents' power usage and manage the various systems to maximize electrical performance while maximizing system health and battery longivity.

In yet other embodiments, relay switches can be provided to allow the solar panel assemblies to be switched between battery banks to more efficiently make use of panel capacity. In this embodiment, two or more sets of panels may be combined to charge a battery bank that is particularly low compared to the other battery banks. This embodiment might be utilized to charge a battery bank more quickly when the weather is overcast and the output of any single panel is far less than can be input into the particular battery bank. Through intelligent management of the system, the ability to switch panels between battery banks as necessary could further enhance the performance and longevity of the system.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "approximately" and "substanitally" as used in this specification and appended claims, refers to plus or minus 10% of the value given.

The terms "about" and "generally" as used in this specification and appended claims, refers to plus or minus 20% of the value given.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

A First Embodiment of an Off-the-Grid Residential Solar Power System

Figure 1:
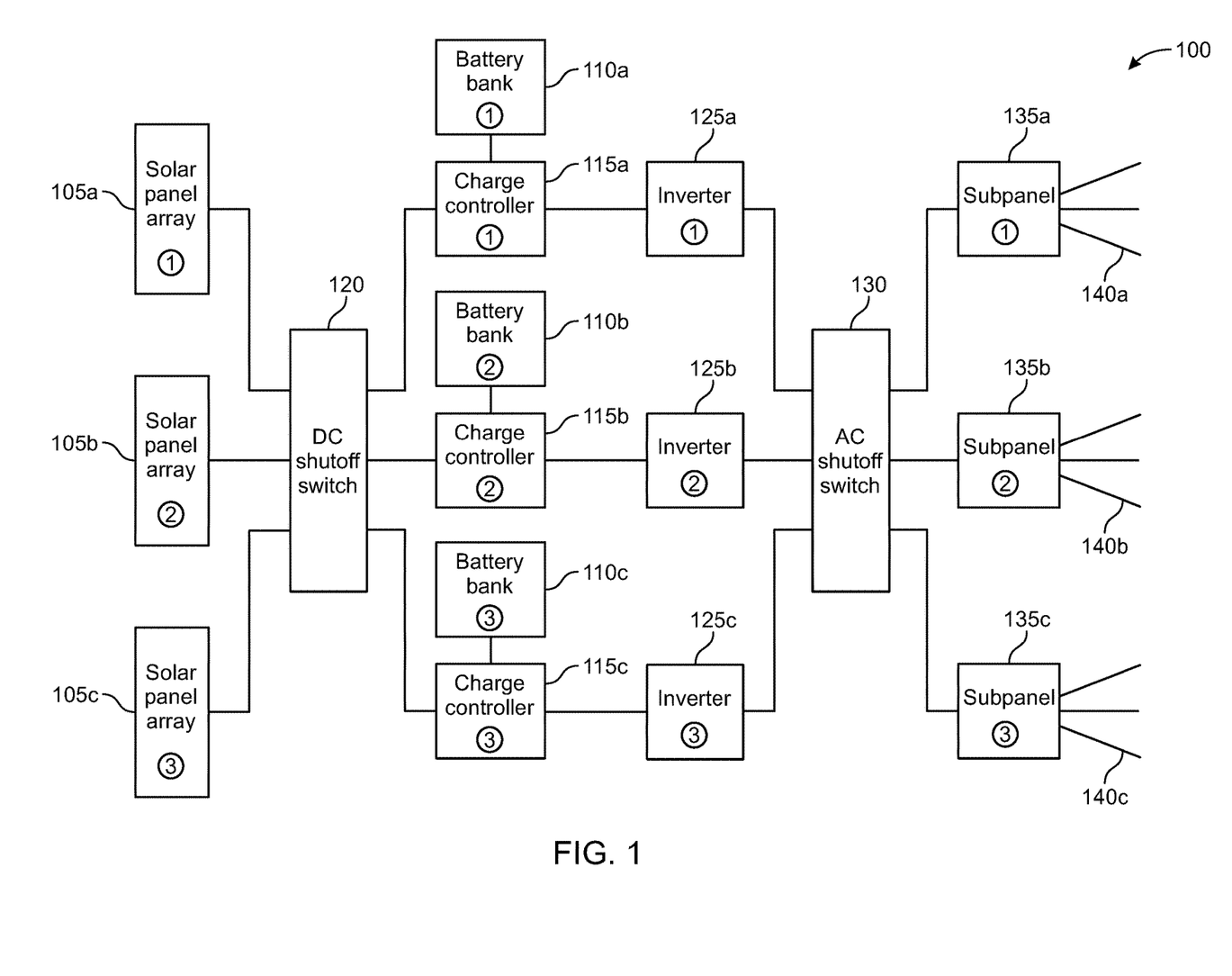
FIG. 1 is a block diagram illustrating an off-the-grid aggregate solar power system according to a first embodiment of the present invention.

FIG. 1 is a block diagram illustrating a first embodiment 100 of the off-the-grid residential solar power aggregate system. As illustrated, the aggregate system comprises three distinct solar power systems that share a single DC shutoff switch 120 and a single AC shutoff switch 130. While three distinct systems are illustrated herein, variations with as few a two systems and more than three systems are known as well.

Each system in the aggregate system includes a solar panel array (or photovoltaic panel array) 105$a$-$c$, a battery bank 110$a$-$c$ comprising one or more rechargeable batteries, charge controllers 115$a$-$c$, an inverter 125$a$-$c$, a subpanel 135$a$-$c$. Each system shares the DC shutoff switch 120 and the AC shutoff switch 130 with the other systems. Each subpanel comprises a plurality of circuit breakers (not shown) that are electrically coupled to either household outlets and/or appliances 140$a$-$c$.

The solar panel array 105$a$-$c$ is configured to convert light into electricity. Accordingly, the panels are typically positioned in a direction that maximizes the time and intensity of sunlight incident on them. In some instances the panels can be mounted on a roof of a building. In other instances, the panels can be mounted on platforms anchored into the ground. In the United States, static panels are typically configured as primarily south facing. In some variations the panels can be attached to one or more gimbal motors that permit the panels to track the sun throughout the day to improve efficiency.

The output capacity of the panel arrays 105$a$-$c$ can vary depending on the particularities of an aggregate system 100 as designed for a particular residence or building. It is further appreciated that the construction and type of photovoltaic utilized in the array can vary as well.

Each battery bank 110$a$-$c$ comprises one or more batteries, although the banks typically comprise multiple batteries to both increase the effective output voltage and capacity thereof. Typically, the batteries are deep cycle lead acid cells or lithium ion batteries. Enough batteries are wired in series to produce the desired voltage, typically 24-48 volts, and the sets of series wired batteries are then wired in parallel to create a bank with the desired capacity in amp hours. Smaller arrays of batteries typically charge faster and more efficiently than larger battery arrays.

The solar panel arrays 105a-c are electrically coupled to the charge controller through a single DC shutoff switch 120 that is described below. The battery banks 110a-c are also electrically coupled to charge controllers 115a-c. In some variations the charge controller may be integrated into the inverter 125a-c, although they are shown as being distinct in FIGS. 1, 3 & 5. The charge controller acts to regulate the charging of the associated battery bank and prevent overcharging thereof. The charge controller can further regulate the flow of electricity from the panels and the battery when a demand for electricity is present.

The charge controller 115a-c is coupled to the Inverter 125a-c. The inverter converts DC current received from the panels and battery bank and converts it into AC electricity while also stepping up the voltage from the typical 12-48 volts to the standard household voltage of 120 or 240 volts.

The inverter 125a-c is then electrically coupled to a subpanel 135a-c of circuit breakers through the AC shutoff switch 130, which is also described below. The incoming AC electricity is, as demanded, distributed in the subpanel to a plurality of circuits through circuit breakers that limit the maximum current draw by the circuit to a level that is deemed safe by code. Some circuits 140a-c can be dedicated to specific high draw appliances such as heaters, air conditioners, ovens and stovetops, and washers and dryers; whereas, other circuits can terminate in electrical outlets.

As indicated above, many electrical codes require that a solar power system have an electrical shutoff for one or both the DC power being fed into system and the AC power being funneled out of the inverter. Often these codes require the switches to be located on the outside of the building in which the system is resident. Ostensibly, one of the reasons for the single switch shutoffs is to provide a means for people that have to enter the premises in an emergency that concerns directly or indirectly electricity to shut off the electricity and minimize concerns that might arise if the electricity were still live. Wherein three distinct systems are active in a building having three separate shutoff switches could confuse emergency personal, who might not realize that power is still live within the house after throwing a first DC and/or AC shutoff switch. Accordingly, in this embodiment and the other embodiments described herein, a single AC shutoff switch 120 and a single DC shutoff switch 130 are provided.

In one variation of the shut off switch, a breaker is provided for each solar power system. Each breaker is mechanically coupled to a single lever such that throwing the lever nearly simultaneously switches each breaker off thereby interrupting DC or AC electrical flow each solar power system in the aggregate solar power system 100.

Of significant consideration in the first embodiment system 100 as well as the other embodiment systems 200 & 300 described herein is the wiring of the various circuits from the subpanels 135a-c. Intuitively, one might wire a residence with the circuits from the first subpanel 140a being associated with one section of the residence, the circuits from the second subpanel 140b being associated with another part of the residence, and the circuits emanating from the third subpanel being associated with yet another section of the residence. While the foregoing is possible and falls within the scope of certain embodiments of the present invention, it may not take full advantage of the aggregated solar power system. Rather, the associated residence can be wired in such a manner that circuits for dedicated high draw appliances and circuits comprising outlets which are most likely to have high draw appliances are distributed among the two or more subpanels regardless of the location of the associated appliance or outlet within the residence.

Figure 2:
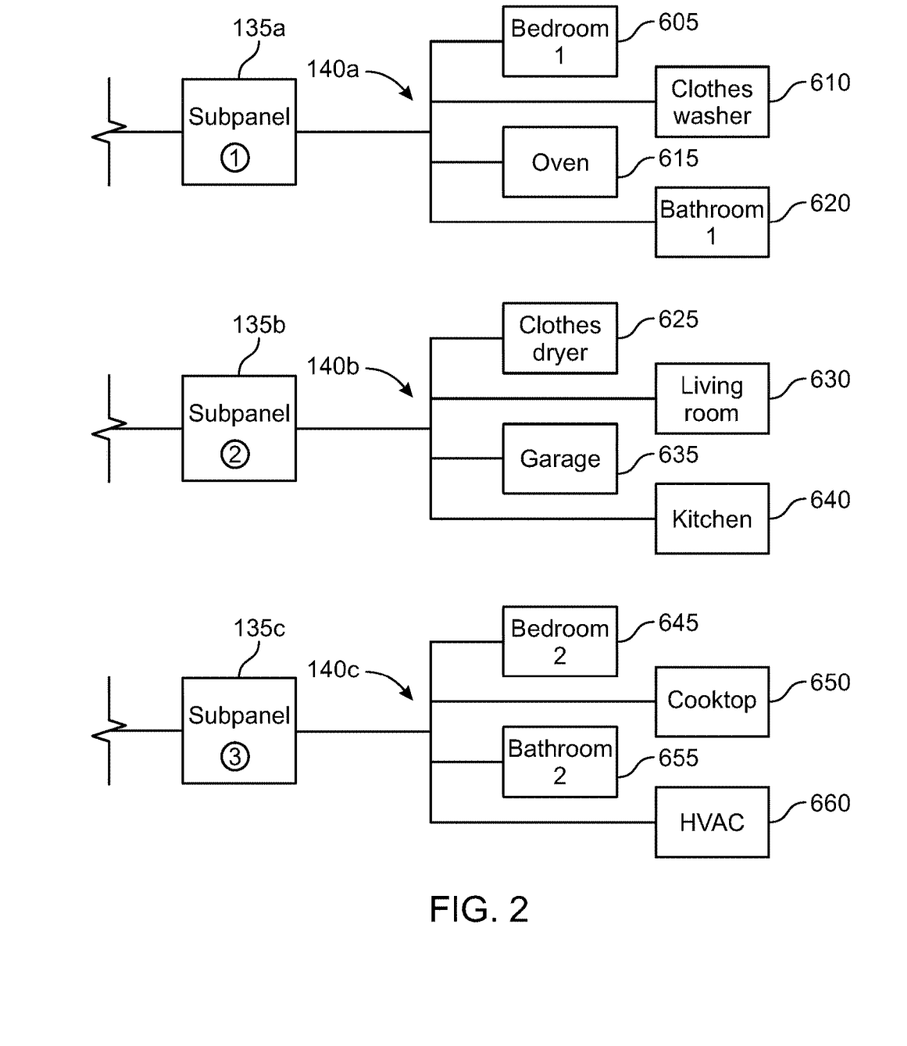
FIG. 2 is an illustrative diagram showing how first, second and third subpanels of a residential building can be wired to maximize the effectiveness of the aggregate solar power system according to embodiments of the present invention.

FIG. 2 provides a diagram of an example of how the circuits 140a-c might be distributed in a residence to take advantage of the aggregate solar power system 100. Of particular note, high draw appliances that might be used simultaneously are wired to different subpanels 135a-c even if the appliances are located in the same room. For instance, the clothes washer 610 can be provided on a circuit connected to the first subpanel 135a with the dryer circuit 625 being located on a circuit connected to the second subpanel 135b. Further, since a cook may need to use both an electric oven 615 and an electric cooktop 650 at the same time the associated circuits are located on different subpanels. Further, the circuit pertaining to kitchen outlets 640 might be on yet another subpanel recognizing it might be used for a food processor or mixer while food is being cooked both on the cooktop and in the oven. Circuits for bathroom outlets 620 & 655 are also located on different subpanels 135a&135c so that high draw appliances, such as hair dryers can be used simultaneously without putting undo strain the electrical system. Circuits for various outlets 605, 630, 635 & 645 in various rooms can be judiciously distributed between all the subpanels. Ultimately, the distribution of circuits across subpanels is chosen so as to minimize the disruption to the normal and regular use of electricity by the inhabitants of the associated residence while at the same time managing battery and system use to maximize longevity and economy.

A Second Embodiment of an Off-the-Grid Residential Solar Power System

Figure 3:
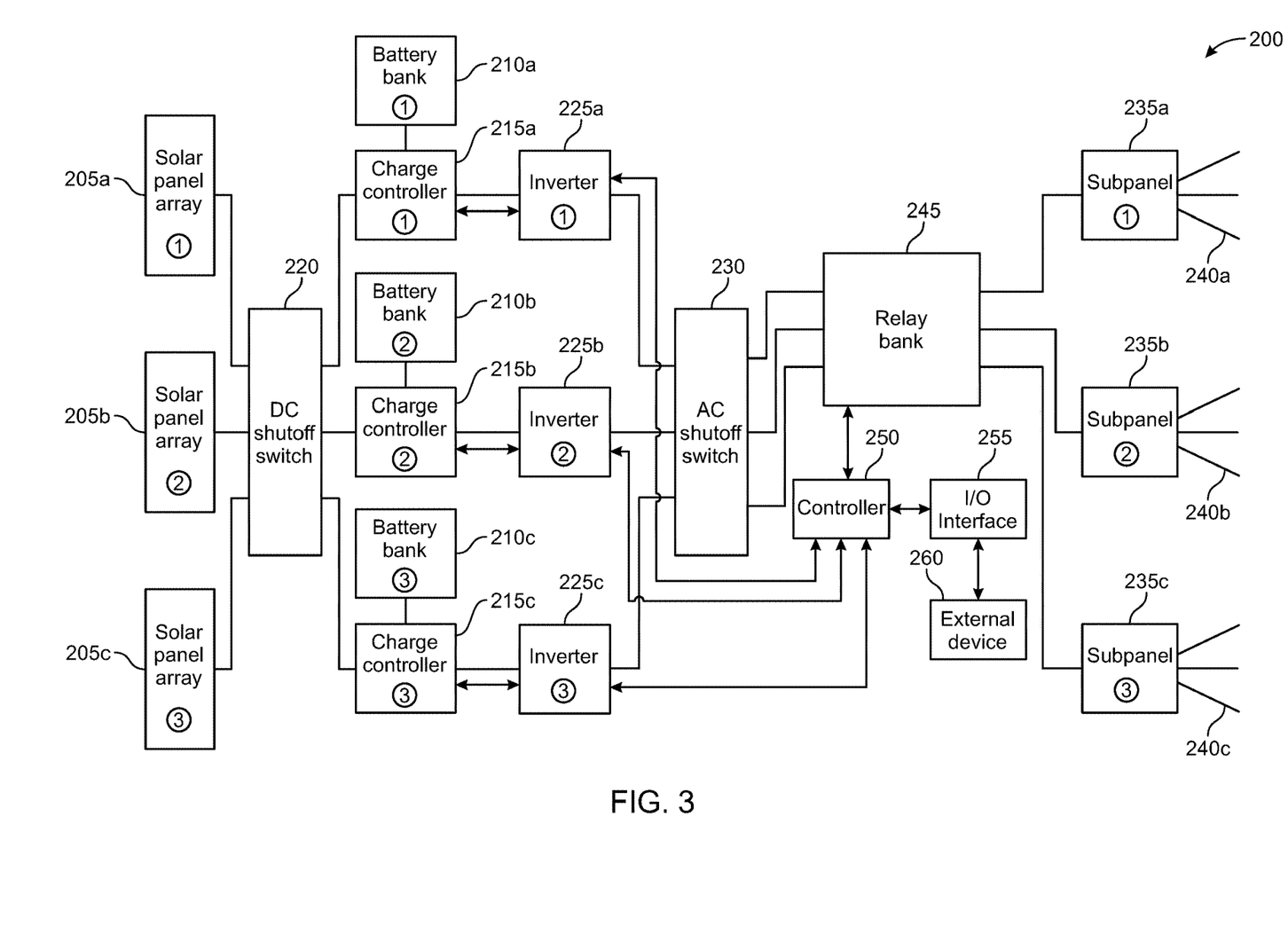
FIG. 3 is a block diagram illustrating an off-the-grid aggregate solar power system according to a second embodiment of the present invention.

FIG. 3 is a block diagram illustrating a second embodiment 200 of the off-the-grid residential aggregate solar power system. As illustrated, the aggregate system comprises three distinct solar power systems that share a single DC shutoff switch 220 and a single AC shutoff switch 230. While three distinct systems are illustrated herein, like the first embodiment, variations with as few a two systems and more than three systems are known as well. The primary difference between the first and second embodiments is the inclusion of a computerized controller 250 and a relay bank 245 that permits the selective switching of subpanels from one system to another adding further flexibility to adjust for real-time load conditions to maximize the utility of the aggregate system and longevity. Otherwise, unless specifically indicated herein, the second embodiment and the various components are similar to those of the first embodiment such that components sharing the last two digits of their element numbers in the second embodiment with those of the first embodiment will not be separately described herein below. Rather, only the differences between the first and second embodiments will be described. Of important note concerning FIG. 3 (and FIG. 5), the lines extending between the various components terminating in arrows indicate wired or wireless transfer of data, and/or electronic signals; whereas, the lines that do not have arrows signify conduits for the flow of electricity as they also do in FIG. 1.

As shown in FIG. 3 a bank of relay switches 245 are positioned between the inverters 225a-c and the subpanels 235a-c. The relay switches are configured to permit the flow of current from any particular inverter to be directed to any particular subpanel. The relay bank is controlled by a controller 250 that is also in electronic communication with the inverters 225a-c and the charge controllers 215a-c. The controller is typically coupled to an I/O interface 255, which in one variation can comprise a touch screen. Further, the controller can be coupled to the internet and/or include wireless connectivity, such as wifi or bluetooth. Through one or both of the internet connection and wireless connectivity, the controller can interface with an external device 260, such as a tablet or a smart phone. Through the external device or the I/O interface a user can monitor the status of the system including, but not limited to, one or more of (i) the state of charge of each battery bank, (ii) the rate of charge of each battery bank, and (iii) the current draw of each system. Variations of the controller can provide alerts to the a designated user, such as one or more of the battery banks being drawn down to undesirable levels of charge.

Figure 4:
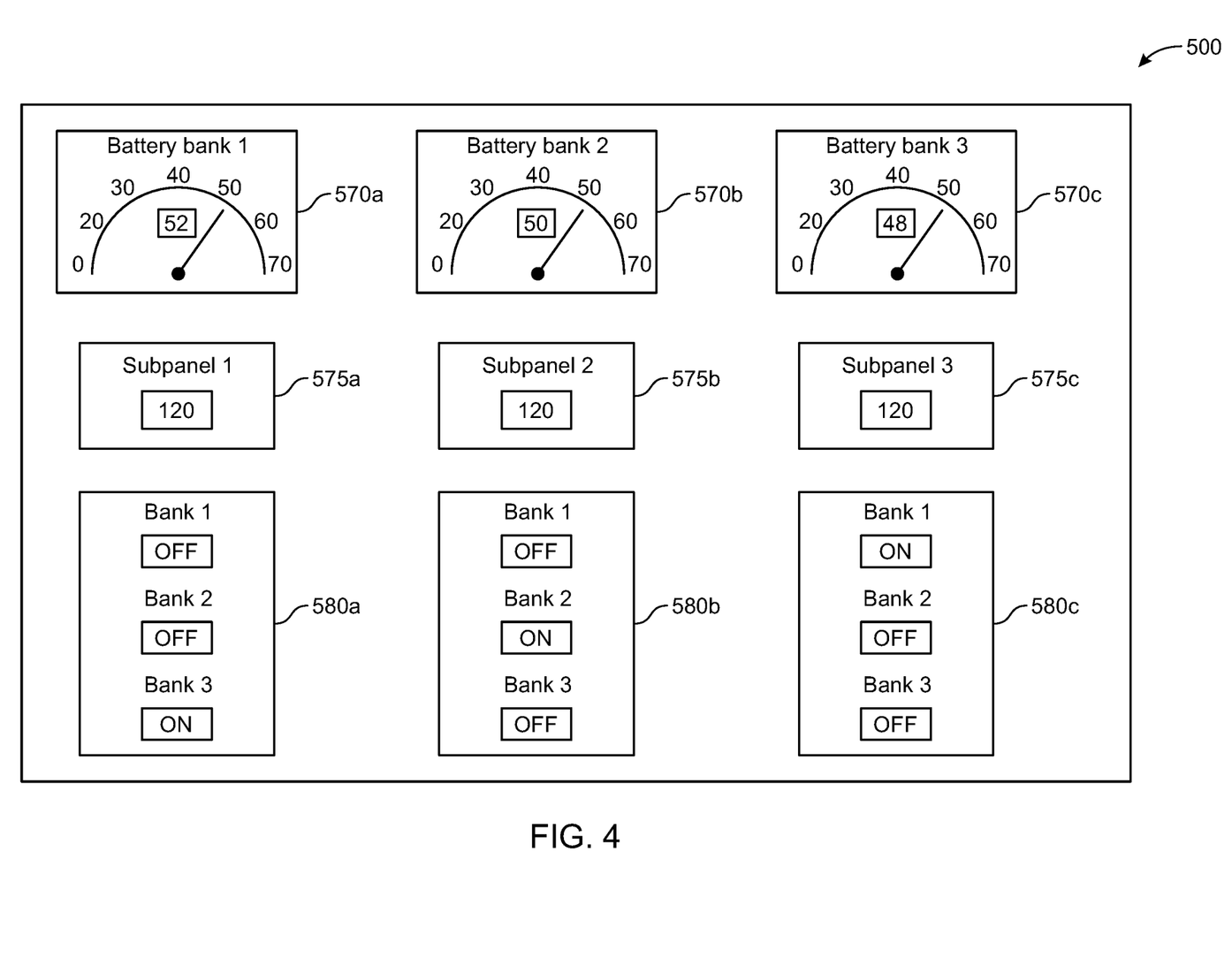
FIG. 4 is a screen shot from an app that can be used with one or more of the foregoing embodiments according to another embodiment of the present invention.

FIG. 4 is a screen shot 500 from an app intended for use on a tablet or smart phone to monitor and control the operation of the solar power aggregate system. A similar screen can be displayed on the I/O interface 260, which can comprise a touch screen monitor. As can be appreciated the screen shot and the screen rendered thereon are mere exemplary and other screen configurations are possible that provide similar functionality.

As shown, boxes 570a-c are provided that render a needle gauge for each of the three battery banks 210a-c. The needle gauges indicate the state of charge of the respective battery bank. Each box includes a numerical readout of the associated battery bank's voltage. In other variations, the readout can include the approximate percentage charge of the battery bank.

Below the battery bank boxes, subpanel boxes are rendered with numerical readouts of the voltage level being supplied to the box by an associated inverter 225a-c, which is typically about 120 volts AC.

The boxes 580a-c directly below the subpanel boxes comprise virtual buttons that permit a user to electrically couple the solar power system associated with the referenced battery to the particular subpanel 235a-c. By pressing the buttons anyone of the three systems can be associated with any particular subpanel, although typically only one system is associated with one subpanel at any one time.

In some variations, the controller 250 can be configured and programmed to automatically switch subpanels 235a-c between solar power systems depending on operational factors such as the state of charge of the associated battery banks 210a-c and the current load draw through the subpanels. For instance, the system may be programmed to pair a subpanel experiencing a significant load with the solar power system having a battery bank with the highest charge state to reduce the probability that any one of the battery banks will be discharged below a predetermined level. By actively maintaining the battery banks above a certain level of charge, such as 50%, longevity of the battery banks can be maximized.

In other variations, the controller 250 may employ machine learning and artificial intelligence to predict when certain subpanels 235a-c might experience high load and accordingly switch systems to better satisfy the demand while limiting the amount of battery bank discharge. In some advanced versions, the controller may take into account outdoor temperature and weather conditions, the time and day of the week, and past resident behavior to match a particular system and its battery bank with the expected load to be drawn through the subpanels.

Figure 5:
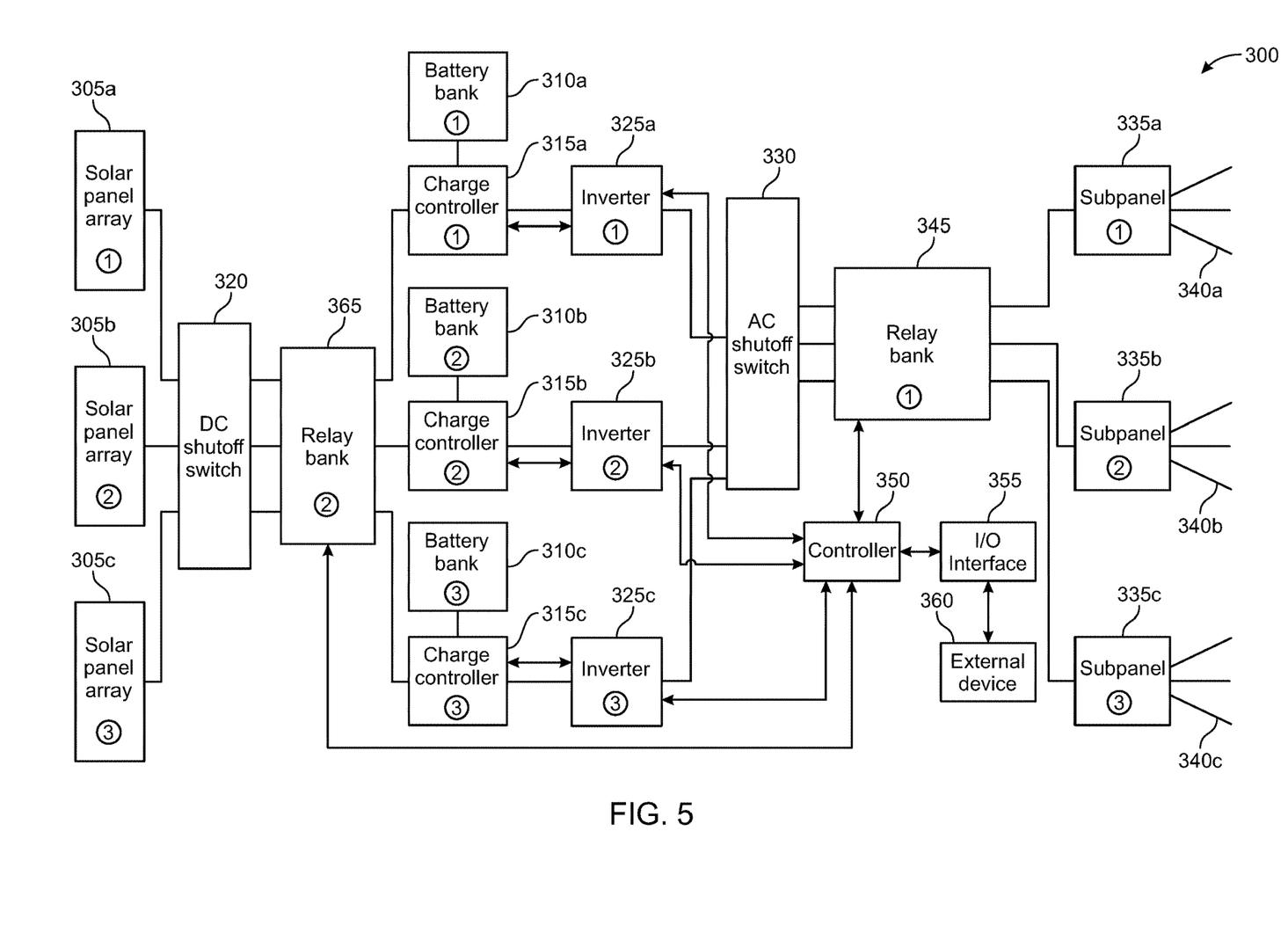
FIG. 5 is a block diagram illustrating an off-the-grid aggregate solar power system according to a third embodiment of the present invention.

A Third Embodiment of an a First Embodiment of an Off-the-Grid Residential Solar Power System FIG. 5 is a block diagram illustrating a third embodiment 300 of the off-the-grid residential solar power aggregate system. As illustrated, the aggregate system comprises three distinct solar power systems that share a single DC shutoff switch 320 and a single AC shutoff switch 330. While three distinct systems are illustrated herein, like the first embodiment, variations with as few a two systems and more than three systems are known as well. The primary difference between second and third embodiments is the inclusion of an additional bank of relays 365 positioned between the solar panel arrays 305a-c and the charge controllers 315a-c that permits the selective switching solar panel arrays between charge controllers. Otherwise, unless specifically indicated herein, the third embodiment and the various components are similar to those of the first and second embodiments such that components sharing the last two digits of their element numbers in the third embodiment with those of the first and second embodiments are separately described herein below. Rather, only the differences between the second and third embodiments will be described.

The additional relay bank 365 is located between the solar panel arrays 305a-c and the charge controllers 315a-c. The relay bank is further coupled to the controller 350 for electronic communication therewith. The connection with the controller can be any suitable means including, but not limited to, a wired connection or a wireless connection. Based on signals received from the controller, the various panels can be switched between the various charge controllers and associated battery banks 310a-c. The direction to switch the connections can be initiated by a user through the controllers I/O interface 355 or an external device 360 running an app. Alternatively, the switch can be initiated by the controller based on an algorithm running on the controller. Machine learning and artificial intelligence can be employed as discussed above.

The ability to switch solar arrays 305a-c between battery banks 310a-c can further improve the performance and efficiency of the aggregate system. In some variations, the number of arrays can be different from the number of charge controllers. For instance in this configuration, three solar panels can be used to charge four banks of batteries with the arrays being switched between battery banks as they become full.

Methods of Using an Off-the-Grid Residential Solar Power System

In the setup of embodiments of the aggregate system 100, 200 & 300, the choice of how to distribute the various circuits 140, 240 & 340 within a building is of significant importance. Circuits that provide current to high load appliances are distributed between the two or more subpanels 135, 235 & 335 such that circuits pertaining high load appliances that are likely to be used simultaneously are typically wired to different subpanels. For instance, since clothes washers and dryers are typically used simultaneously their circuits may be wired to separate panels. Additionally, in a kitchen, an electric stovetop may be connected to a circuit wired to one subpanel while an electric oven may be wired to a circuit associated with another subpanel. By judiciously distributing circuits pertaining to high load appliances and outlets that may provide power to high load devices, the ability of the residents in a building to use electric power on an off the grid solar system without undue concern over taxing the aggregate system or the battery banks too much will be enhanced.

It is to be appreciated that with new system in a new residence/building knowledge as to what circuits are the most used and draw the most current and at what times become known over time and may differ from initial assumptions. As this knowledge is acquired, the location of the various circuits can be switched between subpanels as necessary to reduce the load on the aggregate system as a whole.

Once installed and operational, the residents in the building/residence can use electricity as they desire generally without significant concern of overtaxing the aggregate system. Residents or parties responsible for maintaining the aggregate system may occasionally check the status of the system by accessing the I/O interface 255 & 355 connected to the controller 250 & 350, or alternatively through a web link or app running on a remote device 260 & 360, such as a smart phone. In some variations, the controller may notify the responsible parties when the state of charge in a battery bank falls below or is approaching a predetermined level of charge, so that the party can take necessary action, such as switching the subpanels to different solar power systems, or reducing the current draw on the subpanel(s) associated with particular battery bank(s).

In other variations and embodiments, the controller itself may recognize a condition that will cause one or more battery banks to fall below a predetermined state of charge, and automatically switch the association of subpanels with the solar power systems as necessary to mitigate the situation. As indicated above, the controller can employ machine learning algorithms to optimize the aggregate system and its operation.

VARIATIONS AND OTHER EMBODIMENTS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

The embodiments described herein pertain to aggregate systems wherein the electricity is provided by photovoltaic (solar) panels. However, the present invention is not limited to aggregate systems wherein electricity is provided by solar panels. Rather, the off-the-grid source of electricity is not material to embodiments of the invention. Aggregate systems using hydro, wind, geothermal, solar and more conventional propane or gasoline/oil generators are contemplated and known as are hybrid systems employing combinations of different types of power generators. Further, while the embodiment system are described primarily as being off-the-grid, embodiments are contemplated and known that are also coupled to the grid.

Embodiments and variations of the aggregate system are known where there is not one to one correspondence between the number of batteries banks and power generators. For instance, it may be determined that two solar panel arrays produce enough power over an acceptable period of time to charge three battery banks. As such, an aggregate system might have two solar power arrays to feed three battery banks wherein the arrays are switched between the battery banks as necessary.

Furthermore, other embodiments and variations are known wherein there is not one to one correspondence between the number of rectifiers and the number of subpanels. For instance, there may be five subpanels served by three inverters with two of the inverters being associated with two subpanels and the other with one. This configuration permits more flexibility in switching to further maximize system performance.

The systems discussed herein comprise three battery banks and three inverters; however, systems with as few as two battery banks and two inverters are known. Further, the systems may have more than three inverters and more than three battery banks. Additionally, the aggregate system is scalable wherein an aggregate system utilizing two inverters can be expanded as need arises for an additional power system.

I claim:

1. A building including an aggregate electric power generation and distribution system located one or both of in and proximate the building, the aggregate power and distribution system comprising:

at least first, second and third electric power sources, each power source configured to generate DC current;

at least first, second and third charge controllers, the first charge controller being electrically coupled to the first electric power source, the second charge controller being electrically coupled to the second electric power source, and the third charge controller being electrically coupled to the third power source;

at least first, second and third battery banks, the first battery bank being electrically coupled to the first charge controller, the second battery bank being electrically coupled to the second charge controller, and the third battery bank being coupled to the third charge controller;

at least, second and third DC to AC inverters, the first DC to AC inverter being electrically coupled to the first charge controller, the second DC to AC inverter being electrically coupled to the second charge controller, and the third DC to AC inverter being electrically coupled to the third charge controller;

at least first, second and third subpanels, the first subpanel being electrically coupled to one of the first, second, and third DC to AC inverters, the second subpanel being electrically coupled to another of the first, second, and third DC to AC inverters, and the third subpanel being electrically coupled to yet another other of the first second, and third DC to AC inverters;

a single DC shutoff switch located on an exterior surface of the building, the single DC shutoff switch being configured to, when switched, contemporaneously disconnect the electrical coupling between the first, second and the third electric power sources with the respective first, second and third charge controllers; and a single AC shutoff switch located on an exterior surface of the building, the single AC shutoff switch being configured to, when switched, contemporaneously disconnect at least the electrical coupling between the first and the second DC to AC inverters with the respective first and second subpanels.

2. The building of claim 1, wherein the building is a residential home.

3. The building of claim 1, wherein the building is off-the-grid.

4. The building of claim 1, wherein the first and the second electric power sources comprise solar panel arrays.

5. The building of claim 1, wherein the first and second electric power sources comprise one or more of a solar panel array, a hydroelectric generator, and a wind turbine.

6. A building including an aggregate electric power generation and distribution system located one or both of in and proximate the building, the aggregate power and distribution system comprising:

at least first and second electric power sources, each power source configured to generate DC current;

at least first and second charge controllers, the first charge controller being electrically coupled to the first electric power source, and the second charge controller being electrically coupled to the second electric power source;

at least first and second battery banks, the first battery bank being electrically coupled to the first charge controller, and the second battery bank being electrically coupled to the second charge controller;

at least first and second DC to AC inverters, the first DC to AC inverter being electrically coupled to the first charge controller, and the second DC to AC inverter being electrically coupled to the second charge controller;

at least first and second subpanels, the first subpanel being electrically coupled to one of the first and second DC to AC inverters, and the second subpanel being electrically coupled to the other of the first and second DC to AC inverters;

a single DC shutoff switch located on an exterior surface of the building, the single DC shutoff switch being configured to, when switched, contemporaneously disconnect the electrical coupling between the first and the second electric power sources with the respective first and second charge controllers;

a single AC shutoff switch located on an exterior surface of the building, the single AC shutoff switch being configured to, when switched, contemporaneously disconnect the electrical coupling between the first and the second DC to AC inverters with the respective first and second subpanels a first relay bank, the first relay bank comprising a plurality of relay switches configured to selectively electrically couple and decouple the first and second DC to AC inverters with the first and second subpanels;

a controller, the controller being operatively coupled to the relay bank to initiate the coupling and decoupling; and an I/O interface, the I/O interface being operatively coupled to the controller and configured to send signals to and receive signals from the controller.

7. The building of claim 6, wherein the controller includes a wireless interface for communicating with a remote device.

8. An off-the-grid aggregate electric power generation and distribution system, the aggregate power and distribution system comprising:

at least first and second electric power sources, each power source configured to generate DC current, the first and second electric power sources comprising one or more of a solar panel array, a hydroelectric generator, and a wind turbine;

at least first and second charge controllers, the first charge controller being electrically coupled to the first electric power source, and the second charge controller being electrically coupled to the second electric power source;

at least first and second battery banks, the first battery bank being electrically coupled to the first charge controller, and the second battery bank being electrically coupled to the second charge controller;

at least first and second DC to AC inverters, the first DC to AC inverter being electrically coupled to the first charge controller, and the second DC to AC inverter being electrically coupled to the second charge controller;

at least first and second subpanels, the first subpanel being electrically coupled to one of the first and second DC to AC inverters, and the second subpanel being electrically coupled to the other of the first and second DC to AC inverters;

a single DC shutoff switch, the single DC shutoff switch being configured to, when switched, contemporaneously disconnect the electrical coupling between both the first electric power source and the first charge controller, and the second electric power source and the second charge controller;

a single AC shutoff switch, the single AC shutoff switch being configured to, when switched, contemporaneously disconnect the electrical coupling between the first and the second DC to AC inverters and the respective first and second subpanels;

a first relay bank, the first relay bank comprising a plurality of relay switches configured to selectively electrically couple and decouple the first and second DC to AC inverters with the first and second subpanels;

a controller, the controller being operatively coupled to the relay bank to initiate the coupling and decoupling; and an I/O interface, the I/O interface being operatively coupled to the controller and configured to send signals to and receive signals from the controller.

9. The aggregate power and distribution system of claim 8 wherein at least one of the controller and the I/O interface includes a wireless interface for communicating with a remote device.

10. The aggregate power and distribution system of claim 9, further including the remote device with an app resident on the remote device for communicating with the controller through the wireless interface.

11. The aggregate power and distribution system of claim 10, wherein the app is configured to direct the controller to selectively couple and decouple the first and second inverters from the first and second subpanels.

12. An off-the-grid aggregate electric power generation and distribution system, the aggregate power and distribution system comprising:

at least first and second electric power sources, each power source configured to generate DC current;

at least first and second charge controllers, the first charge controller being electrically coupled to the first electric power source, and the second charge controller being electrically coupled to the second electric power source;

at least first and second battery banks, the first battery bank being electrically coupled to the first charge controller, and the second battery bank being electrically coupled to the second charge controller;

at least first and second DC to AC inverters, the first DC to AC inverter being electrically coupled to the first charge controller, and the second DC to AC inverter being electrically coupled to the second charge controller;

at least first and second subpanels, the first subpanel being electrically coupled to one of the first and second DC to AC inverters, and the second subpanel being electrically coupled to the other of the first and second DC to AC inverters;

a relay bank, the relay bank comprising a plurality of relay switches configured to electrically for selectively coupling and decoupling the first and second DC to AC inverters with the first and second subpanels;

a controller, the controller being operatively coupled to the relay bank to initiate the coupling and decoupling; and an I/O interface, the I/O interface being operatively coupled to the controller and configured to send signals to and receive signals from the controller.

13. The aggregate power and distribution system of claim 12 wherein at least one of the controller and the I/O interface includes a wireless interface for communicating with a remote device.

14. The aggregate power and distribution system of claim 12 further comprising:
- a single DC shutoff switch, the single DC shutoff switch being configured to, when switched, contemporaneously disconnect the electrical coupling between both the first electric power source and the first charge controller, and the second electric power source and the second charge controller; and
- a single AC shutoff switch, the single AC shutoff switch being configured to, when switched, contemporaneously disconnect the electrical coupling between the first and the second DC to AC inverters and the respective first and second subpanels.

* * * * *